(No Model.)
H. WYMAN.
MECHANICAL MOVEMENT.
No. 264,594. Patented Sept. 19, 1882.
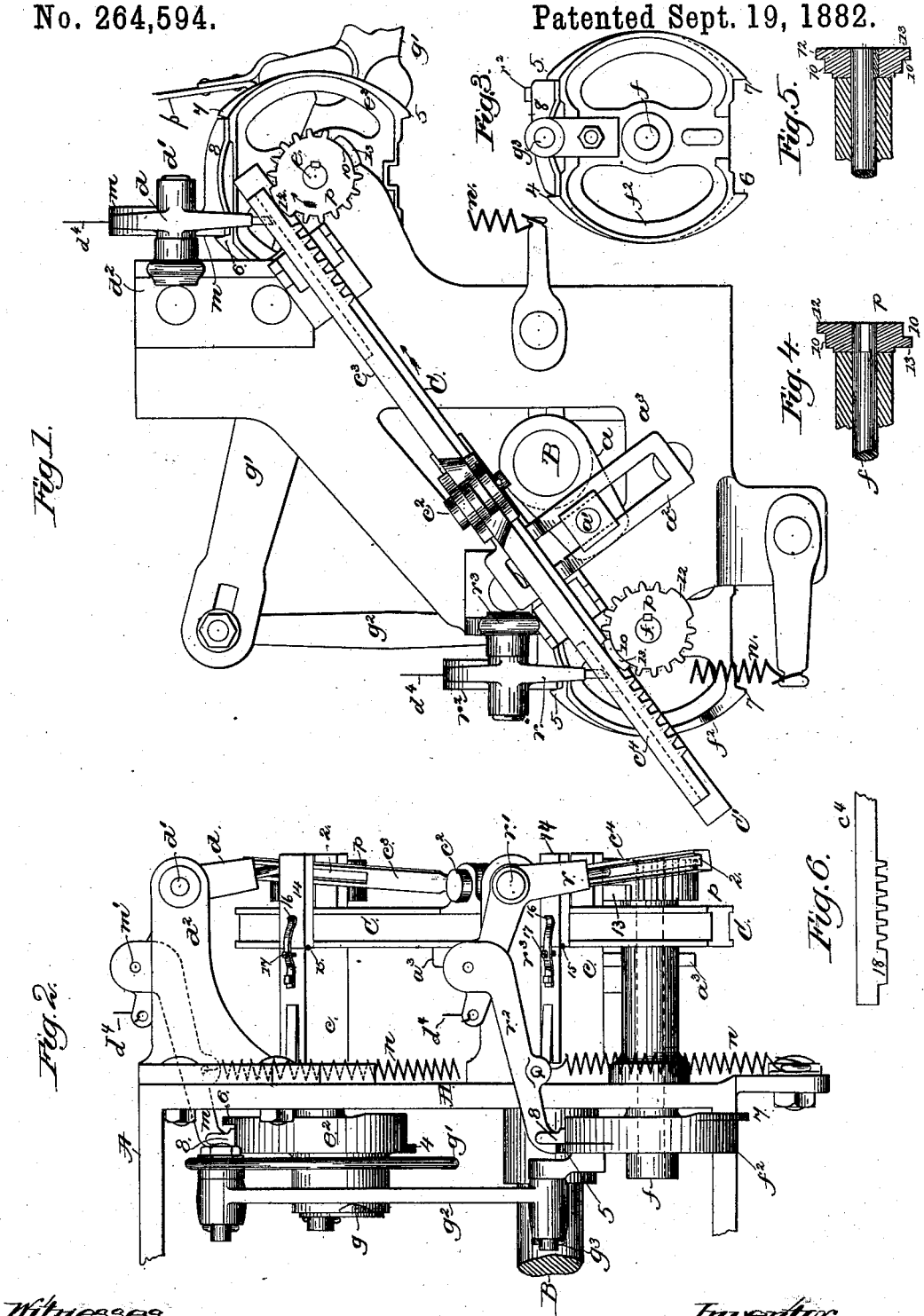

UNITED STATES PATENT OFFICE.

HORACE WYMAN, OF WORCESTER, MASSACHUSETTS.

MECHANICAL MOVEMENT.

SPECIFICATION forming part of Letters Patent No. 264,594, dated September 19, 1882.

Application filed August 15, 1882. (No model.)

*To all whom it may concern:*

Be it known that I, HORACE WYMAN, of Worcester, county of Worcester, State of Massachusetts, have invented an Improvement in Mechanical Movements, of which the following description, in connection with the accompanying drawings, is a specification.

My invention relates to mechanism for converting reciprocating motion into intermitting rotary motion in one direction, or an intermitting oscillation in one and then in the opposite direction; and my invention consists in a slide-bar having one or more pivoted racks, which at suitable times may be turned or swung aside to engage the teeth of a gear connected with the shaft to which it is desired to impart a semi or partial rotation. The gear employed will preferably have two series of teeth extending partially about its circumference, there being between each series of teeth, but at opposite sides of the gear, a long narrow projection of a height equal to the height of the teeth of the series, and at one side of each of the said projections there is a toothless space as deep as the depth of the spaces between the said teeth. The teeth of the gear, shaped as described, and the rack are so proportioned that when the teeth of the rack have moved the gear and shaft on which it is secured for the proper distance one of the toothless spaces on the gear will arrive uppermost and permit the rack-teeth to run out of mesh with the gear and leave the latter, with its shaft, at rest until the rack is again swung or moved about its pivot, so as to engage the long and narrow projection, which I shall denominate the "engaging-tooth," at one side of the space in which the rack rested before it was turned aside. The reciprocations of the rack when it rests in a toothless space do not affect the movement of the gear. These shafts will preferably have attached to them cranks or eccentrics, or both, to co-operate by means of links with different portions of a lever, to move the same at its ends over different distances, according as one or both shafts are moved at the same time; or, if desired, the crank and eccentric might be made to work directly in contact with portions of the lever suitably bored or slotted for such purpose. While the shafts are not performing work they will be held at rest by means of holders under control of springs, the said holder having flat feet to engage notched portions of the peripheries of holding-plates secured to the said shafts. To avoid breaking the mechanism in case the teeth of a rack-bar and the engaging-tooth of a gear fail to properly mesh on the start, I have made the guides for the slide-bar and rack so that they may yield.

Figure 1 represents in side elevation a sufficient portion of mechanism to illustrate my invention; Fig. 2, a left-hand end view of Fig.1; Fig. 3, a detail of one of the holding-disks, with the foot of one of the holding levers or devices in place upon the disk; Fig. 4, a section of one of the gears on one of the shafts, which are to be turned for half a rotation and to be then left at rest. Fig. 5 represents a modification of the gear to be moved by the rack-bar, and Fig. 6 a modified construction of rack-teeth, to be described.

In the drawings, A represents the framework to support the working parts. B is a continuous rotating shaft, having at its end a crank, $a$, and crank-pin $a'$, to enter a slot, $a^2$, in an ear, $a^3$, connected with and shown as depending from the slide-bar C, held in slots in guideways $c\ c$, so that the said bar will be reciprocated uniformly in a straight line as the shaft and crank-pin rotate. The slide-bar C has pivoted upon it, at $c^2$, as herein shown, two racks, $c^3\ c^4$, and the said racks, grooved at one side, as at 2, receive within the said slots one end of a rack-swinging device or lever, $d$ or $r$, pivoted at $d'$ or $r'$ upon a stand, $d^2$ or $r^2$; the foot of which is bolted to the frame-work A. The racks $c^3\ c^4$ also extend through the slots or spaces of the guideways $c\ c$, and beyond the said guideways the teeth at the under sides of the said racks engage the teeth of the gear $p$ below them, or rest in a toothless space, 10, of the said gear. The shafts $e$ and $f$, to be partially rotated and then left at rest for a longer or shorter time, are held in suitable bearings on the frame-work. Shaft $e$, at its rear end, has upon it an eccentric, $g$, which serves as the fulcrum for the lever $g'$—such a lever as shown in my Patent No. 260,349, June 27, 1882. The rear end of the lever $g'$ has attached to it a connecting-rod, $g^2$, the lower end of which is fitted upon a crank-pin, $g^3$, attached to the holding-plate $f^2$, fast on the shaft $f$. Shaft $e$ has connected with it a holding-plate, $e^2$. Each holding-plate $e^2 f^2$ has its periphery notched or cut away at opposite sides its center, as shown best in Fig. 3, so as to leave shoulders 4 5 and 6 7, the shoulders 4 5 being nearest the outer face of the plate, while the shoulders 6 7 are nearest its inner face and the framework. The flattened portions of the plates extend somewhat laterally from the shoulders, so that the foot-pieces 8 of the holding devices $m$ and $r$, both alike, pivoted at $m'$ or $r'$ upon the levers $d$ or $r$, may move horizontally from between the shoulders, and yet continue to rest upon the plate, the withdrawal of a foot-piece from between the said shoulders being necessary before the plate and its carrying-shaft $e$ or $f$ can be rotated. In my patent referred to the shoe did not fit between shoulders, but simply rested on a flat portion of the plates. The foot-pieces 8 are kept pressed down upon the holding-plates by spiral or other suitable springs, $n$, connected with the holding devices $m\ r^2$, and the said devices derive their longitudinal movement, or movement from between the shoulders referred to, from the levers $d$ and $r$, they in turn being moved at the proper time in any suitable manner, but preferably by wires $d^4$, attached to fingers acted upon and moved by a pattern chain or surface. Each shaft $e f$ has secured to its outer end a gear, $p$, of like construction, it having, as herein shown, except in Fig. 5, two series of teeth with six teeth in each series.

Viewing Fig. 1, it will be seen that there is a toothless space, 10, at the side of each gear between each series of six teeth referred to—a space equal in distance to about the space which would be covered by the teeth of the size of those employed on the gear $p$. The gear $p$ (see the section, Fig. 4, at the right-hand end of the space 10) has an engaging-tooth, 12, made as a long toothless projection; but at the opposite side of the shaft carrying the said gear the engaging-tooth 13 is at the left of the toothless space 10, and thus it will be seen that the engaging-tooth 12 is located close to one face or side of the gear $p$ and the tooth 13 close to the opposite face, and that the teeth 12 13 are also diametrically opposite each other.

In Fig. 1 it will be assumed that it is desired to partially rotate shaft $e$. In that figure the engaging-tooth 12, at the right-hand end of the toothless space 10, referred to, is uppermost, and it must be engaged by the first tooth of the rack-bar $c^3$. To insure this it will be supposed that the rack-bar has just been turned out to the right, as in Fig. 2, by the movement of the lever $d$. Now, if the slide-bar C be moved in the direction of the arrow near it in Fig. 1 the teeth of the rack-bar will engage tooth 12 and rotate the gear $p$ and shaft $e$ in the direction of the arrow on it in Fig. 1 until the toothless space at the opposite side of the said gear and in line with the tooth 12 arrives uppermost, when the rack and gear will run out of mesh and the further rotation of shaft $e$ will be stopped. When the lever $d$ was moved to turn the rack-bar into the position Fig. 2 it acted to push the holding device $m$ from between the shoulders 6 7 and placed the foot-piece 8 upon the broad part of the periphery of the plate $e^2$, which latter, in its revolution, brings its shoulders 4 5 next the outer face of the plate uppermost, just as the toothless space 10 opposite tooth 13 is brought into position for the rack to run out of mesh with the teeth of the gear $p$, on shaft $e$, the foot-piece 8, of the holding device $m$, then dropping between the shoulders 4 5 of the plate, locking it and retaining the shaft $e$ in place. Further longitudinal reciprocations of the slide and rack bar will not turn or affect the shaft $e$, and when it is next to be turned the rack-bar must be swung about its pivot $c^2$, or to the left far enough to remove its teeth from the space 10 and place the said teeth in line with the engaging-tooth 13, at the left of the space 10, then uppermost, when the said tooth will be engaged by the teeth of the rack-bar, and the gear $p$ and shaft $e$ will be again rotated a semi-rotation and be again left at rest. The rack-bar $c^4$ operates in like manner with the gear $p$ on shaft $f$, and is operated by the lever $r$, like lever $d$, referred to as being employed to move the rack-bar $c^3$.

The holding device having a foot, 8, employed with the holding-plate $f^2$, is lettered $r^2$. The guideways $c$ have their upper arms, 14, pivoted at 15, and the said arms are acted upon by springs 16, controlled, as to their pressure, by adjusting-screws 17, so that in case the rack-bar and teeth engage improperly when about to be moved together the said arms 14 will rise and obviate breakage of parts.

I do not desire to limit my invention to the exact devices employed to move the rack-bars about their pivotal point $c^2$, as other well-known equivalent mechanism may be employed.

As thus far described, all the teeth of the rack-bar being of equal breadth, it is possible to move the gear $p$ in one direction at one movement of the rack-bar, and in the opposite direction at the return movement of the rack-bar, the latter, however, being moved laterally, as described, between each reciprocation.

If desired, the rack-bar may be so made as to prevent the gear $p$ from being turned, except in one direction. To secure such action, the end tooth first to come opposite the engaging-teeth 12 or 13 must be made sufficiently broad to prevent the rack from being moved laterally while the rack-bar is traveling in that direction of its reciprocation; but as the last tooth of the rack-bar to pass the gear $p$ moves beyond the said gear the rack-bar may be vibrated to meet the engaging-tooth and turn the gear as the rack-bar is reciprocated in the opposite direction.

Viewing Fig. 6, the rack-bar is shown as provided with a broad tooth, 18, at its free end, and so made that the rack-bar can engage and move the gear $p$ only when the rack-bar is reciprocated in the direction of the arrow on it in that figure. By the term "broad tooth" I mean a tooth which in the direction of the length of the rack-bar occupies the space of two or more teeth. The broad tooth, by its contact with the side of tooth 12 or 13, prevents lateral movement of the rack-bar, except in certain defined positions.

If desired, the gear $p$, as in Fig. 5, may have its two engaging-teeth, 12 13, in the same plane or line, in which case, to leave the said gear at rest, the rack-bar would have to be immediately shifted or moved laterally before the rack-bar started on its return movement, and in such modification the shoulders would be removed from the holding-plate, and they would be made as in my patent referred to.

In another application I have shown a reciprocating bar arranged to co-operate with a pinion, some of the teeth of which, by their longitudinal movement, are placed in position to be engaged by the rack-bar.

The lever $g'$ has a strap, $p$, attached to it, (shown in Fig. 1,) which may support a counterbalancing-weight, as in my Patent No. 260,349, June 27, 1882.

I claim—

1. The gear having two series of teeth and two intermediate engaging-teeth, combined with the reciprocating rack-bar adapted to engage the engaging-teeth and then the gear-teeth in line with them to turn the said gear a semi-rotation, substantially as described.

2. The shaft, its gear provided with two series of teeth, toothless spaces, and engaging-teeth, combined with a reciprocating rack-bar, and with means to move the rack-bar both longitudinally and laterally, to operate substantially as described.

3. The slide-bar, its connected depending ear, the shaft B, and crank and crank-pin, and the rack-bars, combined with two shafts, $e f$, a lever, $g'$, moved by them, and two gears on the said shafts, the gears having teeth and toothless spaces and moved by rack-bars to operate the said shafts, substantially as and for the purposes described.

4. The shaft $e$, its attached holding-plate provided with shoulders near its opposite side edges and at opposite sides of the said shaft, combined with the holding devices having feet adapted to rest upon the said plates and enter between the shoulders, as and for the purposes set forth.

5. The gears and the rack-bars, and means to reciprocate the latter, combined with a yielding guideway to permit the rack-bars to yield when not properly engaged with the teeth of the gear, substantially as described.

In testimony whereof I have signed my name to this specification in the presence of two subscribing witnesses.

HORACE WYMAN.

Witnesses:
J. B. SYME,
G. W. GREGORY.